United States Patent [19]

Richter

[11] Patent Number: 4,721,231

[45] Date of Patent: Jan. 26, 1988

[54] CHIPS BIN BLOCKAGE PREVENTING

[75] Inventor: Johan C. F. C. Richter, Nice, France

[73] Assignee: Kamyr, Inc., Glens Falls, N.Y.

[21] Appl. No.: 184,976

[22] Filed: Sep. 8, 1980

[51] Int. Cl.⁴ .............................................. D21C 7/08
[52] U.S. Cl. .................................. 222/146.4; 222/190; 222/199; 222/459; 222/564
[58] Field of Search ................. 222/459, 146 HS, 190, 222/146.4, 199, 200, 460, 462, 575, 564, 547

[56] References Cited

U.S. PATENT DOCUMENTS

| | | | |
|---|---|---|---|
| 2,245,488 | 6/1941 | Marcuse | 222/459 X |
| 2,907,501 | 10/1959 | Laird | 222/459 X |
| 3,710,959 | 1/1973 | Gessler | 222/459 X |
| 3,985,244 | 10/1976 | Gessler et al. | 222/459 X |
| 4,124,440 | 11/1978 | Sherman | 222/146 HS X |

FOREIGN PATENT DOCUMENTS 2137079 2/1973 Fed. Rep. of Germany ...... 222/459

380024 8/1964 Switzerland ..................... 222/459

*Primary Examiner*—Charles A. Marmor
*Attorney, Agent, or Firm*—Nixon & Vanderhye

[57] ABSTRACT

A vessel is provided for holding and discharging loose bulk material, such as cellulosic chips. The vessel includes a cylinder main body with a conical discharge extending downwardly from the body. Chips are fed into the top and discharge from the bottom, with a vibrating discharge structure disposed interiorally of the bottom. In order to prevent hang-up of the chips which might block the outlet a number of prismatic elements are provided attached to the interior side walls of the vessel which terminate generally at the bottom of the main vessel body. The prismatic elements provide void volumes in the loose bulk material flowing downwardly from the inlet to the outlet, so that as the material is being funnelled down for discharge it can fill the void volumes and will not hang-up and block the bulk material outlet.

12 Claims, 3 Drawing Figures

CHIPS BIN BLOCKAGE PREVENTING

BACKGROUND OF THE SUMMARY OF THE INVENTION

In many chemical processes and in many other environments vessels are utilized for holding and subsequently discharging loose bulk material. Such vessels commonly comprise a cylindrical body portion with a funnel-shaped discharge at the bottom. There often are problems in providing a uniform efficient discharge of loose bulk material from the vessel because of this funnelling, therefore it is common procedure to provide a discharge facilitating device such as a vibrator. While most material can be suitably discharged in this manner, there still arise situations where the bulk material will have a tendency to hang-up and block the bulk material outlet, rendering the vessel ineffective to perform its desired function.

In the production of pulp from cellulosic chips material, it has been found desirable to steam the cellulosic chips while directly in the chips bin. The chips bin comprises a structure generally as described above, having a main body portion with a conical discharge extending from the body portion. When steaming is practiced within the bin the possibility of the chips clogging up the outlet are greatly enhanced and even with utilization of a vibrating device blockage of the chips outlet can occur. The wet chips have a tendency to adhere to each other and when they are forced to funnel down for discharge there is no place for the chips to go and compaction and blocking thus can ensue.

According to the present invention the problem of hang-up of loose bulk material in a holding and discharge vessel in general, and particularly the hang-up of wet chips in a chips bin with chips bin steaming, is solved in a simple and inexpensive manner. According to the present invention a plurality of spaced void volumes are formed in the material flowing downwardly adjacent the intersection between the main body of the vessel and the conical discharge. The void volumes provide a volume into which material can move as it is being funnelled downwardly, and resulting compaction, hang-up, and blockage of the material outlet are avoided.

The formation of void volumes in the desired manner according to the present invention is preferably accomplished by providing two or more prismatic elements attached to the interior side walls of the main vessel body and extending substantially vertically at least a portion of the length of the vessel body and terminating at generally the bottom of the main vessel body. Typically the prismatic element would be hollow triangular prisms each having the base thereof fixed (e.g., by welding) to the interior of the main vessel body along the length of the base. The prismatic elements preferably extend radially inwardly from the side walls a distance greater than the radial spacing of the interior of the discharge portion bottom from the side walls, although exact dimensions, spacings, shapes, and the like can be varied widely depending upon the particular situation. The utilization of such prismatic elements allows existing vessels to be readily retrofit, although for structures newly fabricated other techniques may be utilized to effect the void volume formation.

It is the primary object of the present invention to prevent blockage of the material outlet in vessels for holding and discharging loose bulk material, and particularly in chips bins wherein steaming is practiced. This and other objects of the invention will become clear from a detailed description of the invention and from the appended claims.

DETAILED DESCRIPTION OF THE DRAWINGS

Figure 1:
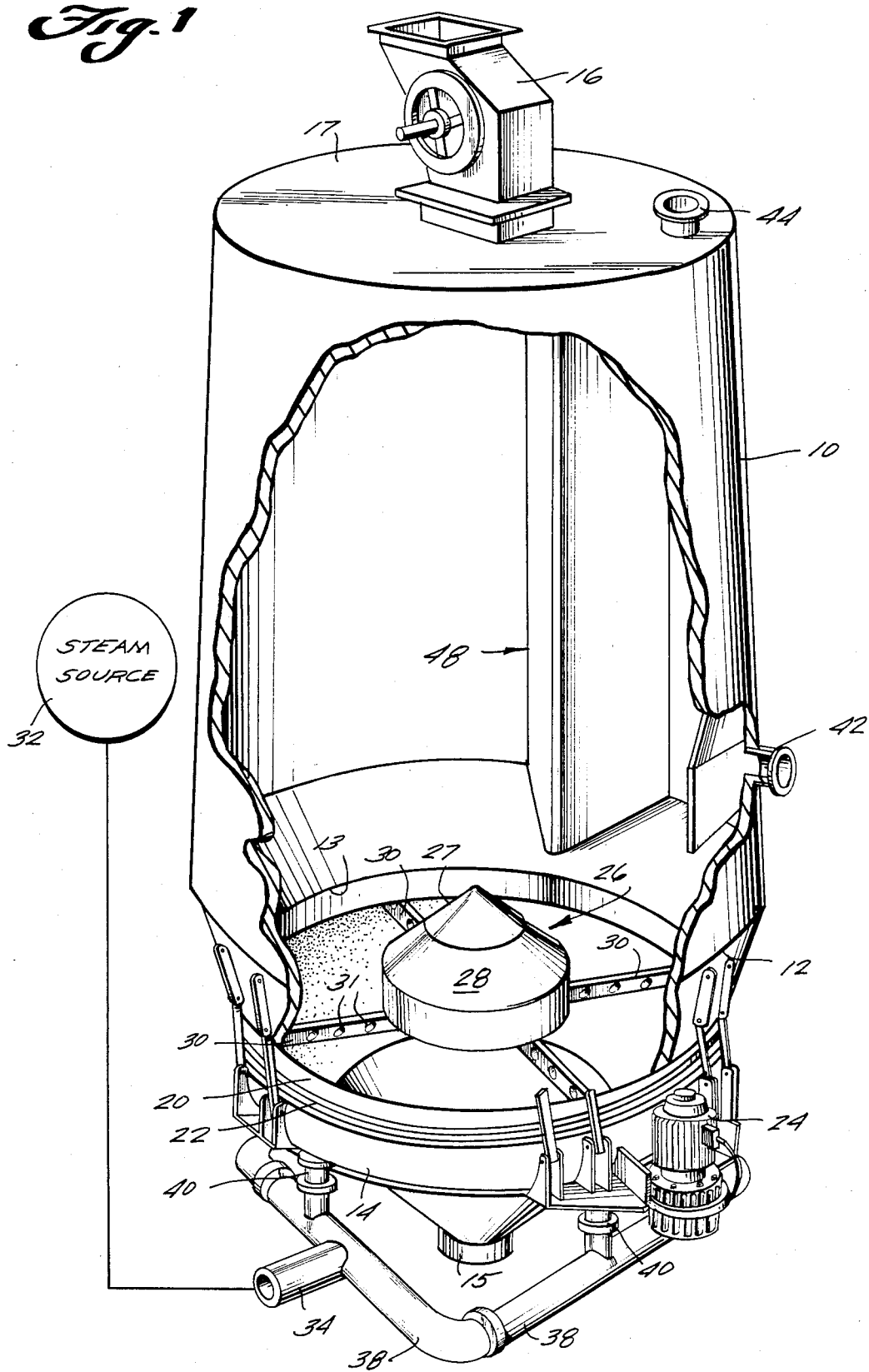
FIG. 1 is a perspective view, with portions cut away for clarity, of an exemplary vessel for holding and discharging loose bulk material utilizing void volume formation means according to the invention.

The principals according the present invention are illustrated in the drawings and described herein with respect to a conventional cellulosic chips bin utilizing chips steaming, such as shown in U.S. Pat. No. 4,124,440 (the disclosure of which is hereby incorporated by reference herein). While the invention is specifically described with respect to such a structure it has broader applicability and can be used in any vertical vessel for holding and discharging loose bulk material where material hang-up and outlet blockage are likely to occur.

The vessel illustrated in drawings includes a main vessel body 10, preferably cylindrical in shape, and having a generally funnel-shaped discharge portion 12 extending downwardly therefrom. The vessel 10 is upright, the walls thereof being substantially vertical and elongated. The conical discharge 12 has a bottom lip 13 which defines an open interior providing a bulk material outlet, and having a smaller cross-sectional area than the cross-sectional area of the main vessel body 10.

Typically a chips bin with chips steaming will have a vibratory discharge structure operatively associated with discharge portion 12, and including a conical material passageway 14 extending downwardly from lip 13 to a further, smaller cross-sectional area outlet 15. Material is introduced through inlet 16 (e.g., an airlock) in the top 17 of the vessel body 10 and flows downwardly until ultimate discharge through the material outlet 15.

In the typical chips bin illustrated in the drawings, the vibratory discharge structure includes the rings 20, 22 connected to the conical discharge portion 12 and the smaller diameter conical passageway 14, respectively with power means 24 effecting oscillatory movement of the components 14, 22 with respect to the components 12, 20. The discharge structure also includes a vibrator cone 26 having a top cone portion 27 and a bottom cone portion 28. The vibrator cone 26 is connected by a plurality of arms 30 to the structure 14. Steaming of chips within the vessel 10 is accomplished by introducing the steam through orifices 31 formed in the hollow arms 30. The arms 30 are connected up to a steam source 32 by the conduit 34, rectangular pipe-header arrangement 38, and a flexible conduit 40 reaching from each leg of the header to an arm 30. Steam also passes through at least one of the arms 30 to the interior of the vibrator cone 26 to pass into the vessel 10 between the top cone portion 27 and bottom cone portion 28. The chips bin also conventionally includes a low pressure feeder exhaust conduit 42, and an exhaust conduit 44 leading to a condenser or a lime kiln of a pulp digesting system or the like.

The structure described above is conventional. While suitable discharge is normally accomplished, there are times when hang-up of the chips and blockage of the outlet 15 occurs. Blockage is more likely when steaming of the chips is practiced, as described above.

Figure 2:
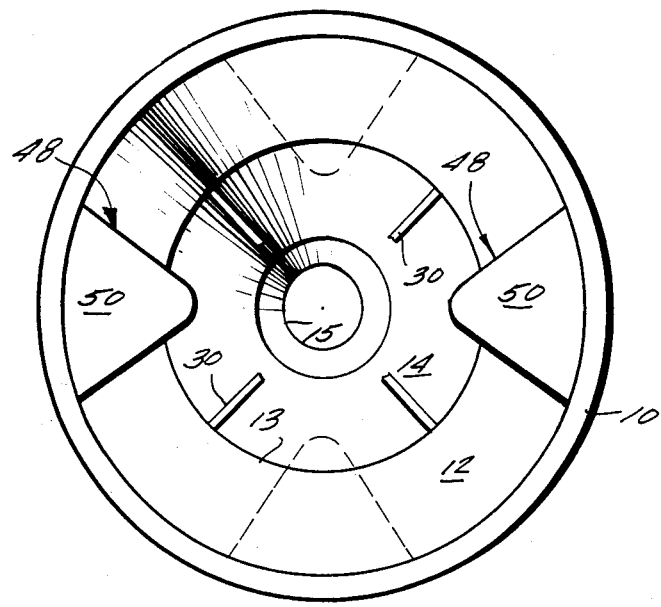
FIG. 2 is a top view of the structure of FIG. 1, with the top thereof removed for clarity of illustration.

In order to prevent blockage of the material outlet, according to the present invention means are provided for forming a plurality of spaced void volumes in the loose bulk material flowing downwardly from inlet 16 to outlet 15, adjacent the intersection between the main vessel body 10 and the discharge portion 12, so that the loose bulk material will not hang up and block the outlet 15. The introduction of such void volumes is preferably accomplished according to the present invention by providing a plurality of elongated volume-occupying elements extending vertically at least a portion of the length of the chips bin adn terminating adjacent the intersection of the bin and the funnel-shaped discharge. Such volume-occupying elements preferably are prismatic elements 48 attached to the interior side walls of the vessel 10 at spaced locations. As illustrated in FIG. 2, preferably two such prismatic elements 48 are provided, spaced substantially 180° apart around the circumference of the vessel 10, although three or four elements 48 may be provided if necessary or desirable (see dotted line elements in FIG. 2).

In order to save on material costs, the prismatic elements 48 preferably are hollow, having a top plate 50 (see FIG. 2), bottom plate 52 (see FIG. 3), and hollow interior. The elements 48 may be connectd to the interior side walls in any suitable manner, such as by welding. A preferred shape of the prismatic elements 48, as illustrated most clearly in FIGS. 1 and 2, is a triangular prism, having the base thereof fixed to the interior of the vessel body 10 side walls along the length of the base. In some circumstances, the bottom 52 of each prismatic element 48 need not be provided, and in some circumstances even the tops 50 of the elements 48 are not necessary as long as material will not gain access to the interior volume of the elements 48 from the top thereof.

Disposed in the manner illustrated in the drawings, each of the prismatic elements 48 will form a void volume V (see FIG. 3) in the chips C or like bulk material in the vessel. The void volumes V will allow a volume to be displaced into during the funnelling down process provided by the conical discharge portion 12, and subsequent discharge by the vibratory structure including vibrating cone 26. As illustrated in the drawings the prismatic elements 48 may extend radially inwardly from the side walls a distance greater than the spacing of the lip 13, however the exact dimensions, shape, and placement of the elements 48 can vary widely depending upon the particular circumstances. Such parameters can take any form that provides for the production of the desired void volumes V.

According to the present invention it is easy to retrofit existing structures merely by gaining access to the interior of the vessel 10 and welding the prismatic element 48 in place. Such a technique can also be used in the construction of new vessels, or when new vessels are constructed the design of the walls thereof can take into account the desired void-volume formation.

Figure 3:
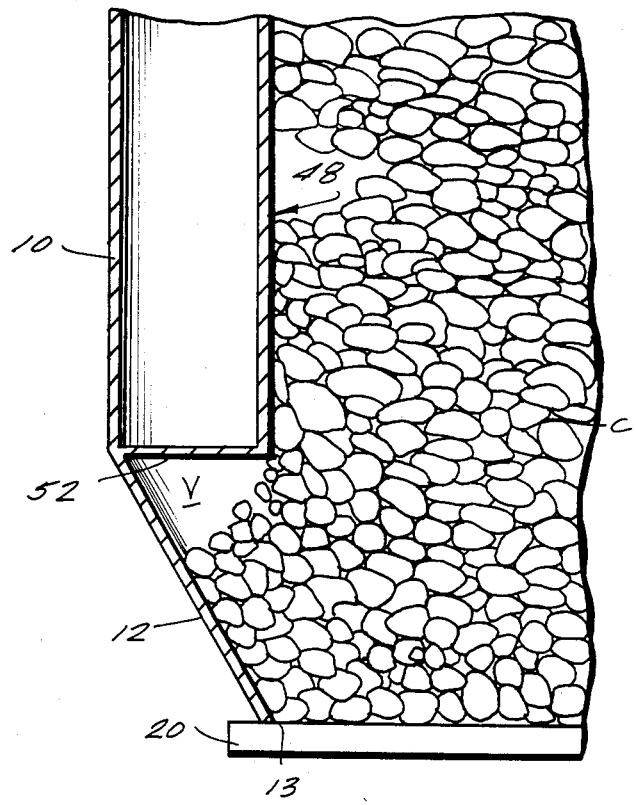
FIG. 3 is a detailed cross-sectional view of a portion of the vessel of FIG. 1 schematically illustrating void-volume formation therein.

Utilizing the apparatus heretofore described particularly for practicing a method of steaming cellulosic chips material, cellulosic chips material is introduced into the chips bin through inlet 16 thereof while steam is introduced adjacent the bottom thereof from steam source 32 through conduits 34, 38, 40, and ultimately through arms 30 and between cone portions 27 and 28. A plurality of spaced void volumes V (see FIG. 3) are formed in the chips material flowing downwardly in the chips bin, adjacent the intersection between the bin 10 and the funnel-shaped discharge 12 therefor so that the cellulosic chips will not hang-up and block the chips outlet 15; and the steamed chips are withdrawn through the outlet 15 from the bottom of the funnel-shaped discharge. The void-volumes forming step is accomplished by disposing a plurality of the elongated volume-occupying elements 48 extending vertically at least a portion of the length of the chips bin and terminating adjacent the intersection of the bin and the funnel-shape discharge (as illustrated in FIG. 3).

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A vessel for holding and discharging loose bulk material, comprising
    a main vessel body having an interior open cross-sectional area A, and substantially vertical elongated side walls, and having a loose bulk material inlet at the top thereof;
    a generally funnel-shaped discharge portion extending downwardly from the bottom of said main vessel body, and having a bottom portion thereof with an interior open cross-sectional area A', wherein A' is substantially less than A, with a loose bulk material outlet from the bottom portion; and
    means for providing a plurality of spaced void volumes in loose bulk material flowing downwardly from said inlet to said outlet, adjacent the intersection between said main vessel bottom at said side walls and said funnel-shaped discharge portion, so that the loose bulk material will not hang-up and block said bulk material outlet, said means consisting of a plurality of prismatic elements, each attached to the interior side walls of said main vessel body and substantially vertically extending at least a portion of the length of said main vessel body, and each terminating at generally the bottom of said main vessel body.

2. A vessel as recited in claim 1 wherein said prismatic elements are hollow.

3. A vessel as recited in claims 1 or 2 wherein said prismatic elements are triangular prisms each having the base thereof fixed to the interior of said main vessel body side walls along the length of said base.

4. A vessel as recited in claim 2 wherein each of said prismatic elements extends radially inwardly from said side walls a distance greater than the radial spacing of the interior of said discharge portion bottom portion from said side walls.

5. A vessel as recited claims 1, 2, or 4 wherein said vessel further comprises a vibratory discharge structure operatively associated with said generally funnel-shaped discharge portion, and including a conical material passageway from said loose bulk material outlet to a further, smaller cross-sectional area loose bulk material outlet.

6. A vessel as recited in claim 5 wherein said vibratory discharge structure includes a vibrator cone supported by a plurality of radially extending arms, and power means for effecting vibration of said vibrator cone and conical material passageway; and further comprising means for introducing steam into the interior volume of said vessel, said steam introduction means including means for introducing steam through said vibrator cone supporting arms.

7. A vessel as recited in claim 1, 2, or 4 wherein said vessel body is circular in cross-section, and said discharge portion is a truncated cone.

8. A vessel as recited in claim 2 wherein said vessel body is circular in cross-section, and said discharge portion is a truncated cone, and wherein two prismatic elements are provided, spaced substantially 180° apart from each other around the interior circumference of said vessel body.

9. A method of steaming cellulosic chips material utilizing a vertical chips bin having a funnel-shaped discharge at the bottom thereof, comprising the steps of: introducing cellulosic chips material into the chips bin at the top thereof; introducing steam into the chips bin adjacent the bottom thereof; forming a plurality of spaced void volumes in the cellulosic chips material flowing downwardly in the chips bin adjacent the intersection between the bin and the funnel-shaped discharge so that cellulosic chips material will not hang-up and block the discharge by disposing a plurality of elongated volume-occupying elements extending vertically at least a portion of the length of the chips bin and terminating adjacent the intersection of the bin and the funnel-shaped discharge; and withdrawing steamed chips from the chips bin through the bottom funnel-shaped discharge.

10. A vessel for holding and discharging loose bulk material, comprising a cylindrical main vessel body with vertical elongated side walls, and an inlet at the top thereof; a conical discharge portion extending downwardly from said vessel body to a material outlet; and a plurality of prismatic elements vertically extending in the interior of said main vessel body connected to the side walls thereof, and terminating adjacent the bottom of said main vessel body.

11. A vessel as recited in claims 1 or 10 wherein each of said prismatic elements extends substantially the entire length of main vessel body side walls.

12. A vessel as recited in claims 1 or 10 wherein said prismatic elements have the tops and bottoms thereof formed by flat plates.

* * * * *